United States Patent
Jonker et al.

(10) Patent No.: US 8,251,319 B2
(45) Date of Patent: Aug. 28, 2012

(54) CONTROLLING THE BOUNDARY LAYER OF AN AIRFOIL

(75) Inventors: Adrianus Stefanus Jonker, Potchefstroom (ZA); Johannes Jacobus Bosman, Noordbrug (ZA)

(73) Assignee: North-West University (ZA)

( * ) Notice: Subject to any disclaimer, the term of this patent is extended or adjusted under 35 U.S.C. 154(b) by 819 days.

(21) Appl. No.: 12/096,113

(22) PCT Filed: Dec. 1, 2006

(86) PCT No.: PCT/IB2006/054550
§ 371 (c)(1),
(2), (4) Date: Nov. 6, 2008

(87) PCT Pub. No.: WO2007/072259
PCT Pub. Date: Jun. 28, 2007

(65) Prior Publication Data
US 2010/0270434 A1    Oct. 28, 2010

(30) Foreign Application Priority Data
Dec. 20, 2005 (ZA) .................. 2005/10346

(51) Int. Cl.
B64C 21/04 (2006.01)
(52) U.S. Cl. ......... 244/208; 244/207; 244/209; 244/204
(58) Field of Classification Search .............. 244/208, 244/204, 12.1, 12.5, 212, 209, 80, 3, 213, 244/215, 23 D, 207; 114/278, 67 R; 290/55; 446/61; 72/340
See application file for complete search history.

(56) References Cited

U.S. PATENT DOCUMENTS

| | | | | |
|---|---|---|---|---|
| 2,833,492 A * | 5/1958 | Fowler | ......... | 244/209 |
| 3,159,362 A * | 12/1964 | Laing | ......... | 244/12.1 |
| 4,117,996 A * | 10/1978 | Sherman | ......... | 244/212 |
| 4,575,030 A | 3/1986 | Gratzer | | |
| 5,115,996 A * | 5/1992 | Moller | ......... | 244/12.5 |
| 5,253,828 A | 10/1993 | Cox | | |
| 5,590,854 A * | 1/1997 | Shatz | ......... | 244/206 |
| 6,167,829 B1 * | 1/2001 | Lang | ......... | 114/278 |
| 6,439,148 B1 * | 8/2002 | Lang | ......... | 114/278 |
| 7,134,631 B2 * | 11/2006 | Loth | ......... | 244/209 |
| 7,798,450 B2 * | 9/2010 | Patzelt et al. | ......... | 244/211 |
| 2008/0061559 A1 * | 3/2008 | Hirshberg | ......... | 290/55 |

FOREIGN PATENT DOCUMENTS

DE    29817545 U1    8/1999

(Continued)

OTHER PUBLICATIONS

"International Application No. PCT/IB2006/054550, International Preliminary Report on Patentability mailed Jan. 3, 2008", 7 pgs.

(Continued)

*Primary Examiner* — Christopher P Ellis
*Assistant Examiner* — Medhat Badawi
(74) *Attorney, Agent, or Firm* — Schwegman, Lundberg & Woessner, P.A.

(57) ABSTRACT

This invention relates to a method and system (10) for controlling the boundary layer of an airfoil (12) to reduce profile drag during flap deflection. The system (10) comprises first means for blowing air from a lower surface (14) of the airfoil (12) to trip airflow from laminar flow to turbulent flow during positive flap deflection; and second means for applying a suction force at the lower surface (14) of the airfoil (12) to preserve laminar flow during negative flap deflection.

18 Claims, 2 Drawing Sheets

FOREIGN PATENT DOCUMENTS

| | | | |
|---|---|---|---|
| EP | 0052242 | A1 | 5/1982 |
| EP | 0436243 | A2 | 7/1991 |
| WO | WO-2005113334 | A1 | 12/2005 |

OTHER PUBLICATIONS

"International Application No. PCT/IB2006/054550, International Search Report and Written Opinion mailed Jul. 25, 2007", 6 pgs.

* cited by examiner

CONTROLLING THE BOUNDARY LAYER OF AN AIRFOIL

RELATED APPLICATIONS

This application is a U.S. National Stage filing under 35 U.S.C. 371 from International Application Number PCT/IB2006/054550, filed Dec. 1, 2006 and published in English as WO 2007/072259 on Jun. 28, 2007, which claims the benefit of South Africa Application, Serial Number 2005/10346, filed Dec. 20, 2005, which applications and publication are incorporated herein by reference in their entirety for any purpose.

INTRODUCTION AND BACKGROUND TO THE INVENTION

This invention relates to a method and system for controlling the boundary layer of an airfoil.

Sailplanes generally have laminar flow airfoils. These airfoils allow laminar airflow of up to 70% on the upper surface thereof and up to 93% on the lower surface thereof. Normal transition of laminar flow to turbulent flow occurs through the laminar separation bubble process. It has been shown that a normal laminar separation bubble results in higher profile drag than when transition is forced artificially.

Currently two methods are used to artificially force laminar flow to turbulent flow. The first method utilises a turbulator tape applied to the airfoil, which is provided with small three-dimensional obstacles along its length, and which trips the boundary layer flow from laminar to turbulent. The second method uses pneumatic turbulators which blow air through small holes provided along the length of the lower surface of the airfoil. This again trips the boundary layer flow from laminar to turbulent. The holes are located at a maximum position of 93% of the chord length of the airfoil towards the trailing edge thereof. The second method could also include small holes provided along the length of the upper surface of the airfoil and through which air is sucked into the airfoil.

A conventional airfoil usually includes a movable flap on its trailing edge, which changes the camber of the airfoil and effectively alters the shape of the airfoil. However, the addition of a flap to the trailing edge of the airfoil introduces a flap gap, at the point where the flap moves relative to the airfoil. When the flap is deflected a flap kink forms at the point of deflection. When the flap is in the cruise position (undeflected), air flow over the flap gap is up to 93% laminar flow with the remainder being turbulent flow. Generally, at the flap gap position, the laminar flow is tripped to turbulent flow and only about 84% laminar flow is possible with an associated increase in drag. It is possible, but very difficult, to seal and smooth the flap gap so that the flow is not tripped to turbulent flow at that position.

It has been demonstrated in commercial gliders that it is feasible to take the laminar boundary layer beyond the flap gap and to apply artificial transition on the flap surface. This is, however, only possible in the zero degree flap deflection position, where the bottom surface is undeflected. As soon as the flap is deflected to a positive flap deflection position, the kink in the airfoil surface trips the boundary layer flow to turbulent flow. A laminar separation bubble is then formed at this position and as a result is reattached turbulently on the flap, which leads to increased drag.

OBJECT OF THE INVENTION

It is therefore an object of the present invention to provide a method and system for controlling the boundary layer of an airfoil which is an improvement to the above described methods.

SUMMARY OF THE INVENTION

According to a first aspect of the invention there is provided a method for controlling the boundary layer of a laminar flow airfoil to reduce profile drag during flap deflection including the steps of:
  tripping the flow from laminar to turbulent during positive flap deflection; and
  preserving laminar flow during negative flap deflection.

The step of tripping the flow from laminar to turbulent during positive flap deflection may include the further step of blowing air from the lower surface of the airfoil.

The step of blowing air from the lower surface of the airfoil may include the step of blowing the air in a direction normal to the surface from which it is blown.

The airfoil may include a pivotable flap and may define a flap gap at the point where the flap pivots, and the step of blowing air from the lower surface of the airfoil may include the further step of blowing air from the airfoil at a position towards the trailing edge of the airfoil but on the side of the leading edge relative to the flap gap.

The step of blowing air from the lower surface of the airfoil may include the further step of blowing air from the airfoil at a position of from 65% to 80%, preferably 71% of the chord length of the airfoil from the leading edge towards the trailing edge of the airfoil.

The airfoil may be in the form of a wing.

The step of blowing air from the lower surface of the airfoil may include the further step of blowing air from a plurality of holes defined along the length of the lower surface of the wing.

The step of preserving laminar flow during negative flap deflection may include the step of applying a suction force at the lower surface of the airfoil.

The steps of blowing air from the lower surface of the airfoil and applying a suction force at the lower surface of the airfoil may include the further step of blowing and applying a suction force from a plurality of holes defined in the lower surface of the wing.

The step of blowing and applying a suction force from the plurality of holes may include the even further step of blowing and applying a suction force from the same plurality of holes.

The plurality of holes may be a first plurality of holes and there may be provided a second plurality of holes defined along the length of the lower surface of the flap at a position of from 90% to 98%, preferably 95% of the chord length of the airfoil from the leading edge towards the trailing edge of the airfoil.

The method may include the further step of blowing air from the second plurality of holes at least when the flaps are in the negative deflection position, in order to trip the laminar flow to turbulent flow at the flap in order to reduce the drag, by reducing separation bubble formation.

According to a second aspect of the invention there is provided a system for controlling the boundary layer of a laminar flow airfoil to reduce profile drag during flap deflection comprising:
  first means for blowing air from a lower surface of the airfoil to trip flow from laminar to turbulent during positive flap deflection; and second means for applying a suction force at the lower surface of the airfoil to preserve laminar flow during negative flap deflection.

The first means for blowing air from the airfoil may be adapted to blow air in a direction normal to the surface from which it is blown.

The first means for blowing air may include a passage along the inside length of the airfoil along which the air may be blown, in use.

The first means for blowing the air may further include a blowing device such as a pump for blowing air along the passage.

The air may be blown from the passage through a plurality of holes defined along the length of the lower surface of the wing.

The airfoil may include a pivotable flap and may define a flap gap at the point where the flap pivots, and the air may be blown from holes located at a position towards the trailing edge of the airfoil but on the side of the leading edge relative to the flap gap.

The holes may be located at a position of from 65% to 80%, preferably 71% of the chord length of the airfoil from the leading edge towards the trailing edge of the airfoil.

The second means for applying a suction force at the lower surface of the airfoil may include a passage along the inside length of the wing along which the air may be sucked.

The passage along which the air is blown may be same passage as the passage along which the air is sucked.

The second means for applying a suction force may further include a suction device for sucking air from the passage, such as a suction-pump.

The air may be sucked along the passage from a plurality of holes defined along the length of the lower surface of the wing.

The plurality of holes from which the air may be sucked may be the same plurality of holes through which the air is blown.

The plurality of holes may be a first plurality of holes and the system may include a second plurality of holes defined along the length of the lower surface of the flaps at a position of from 90% to 98%, preferably 95% of the chord length of the airfoil from the leading edge towards the trailing edge of the airfoil.

The system may include a third means for blowing air, which blows air from the second plurality of holes at least when the flaps are in the negative deflection, in order to trip the laminar flow to turbulent flow at the flap in order to reduce the drag, by reducing separation bubble formation.

The passage may be a first passage and the system may include a second passage along which the third means for blowing air may blow air through the second plurality of holes.

The third means for blowing the air may include a blowing device such as a pump for blowing air along the passage.

The first and the second plurality of holes may consist of between 1500 and 2500 holes each, preferably 2000 holes each.

The holes may be spaced apart from each other at a distance of from 3 mm to 20 mm, preferably from 8 mm to 12 mm.

The diameter of each hole may be from 0.2 mm to 2 mm, preferably 0.7 mm.

The second means for applying a suction force and the first and third means for blowing air may be a single pump, which blows and sucks air.

The system may be utilised by a sailplane and the device for applying a suction force and for blowing air may be connected to controls of the sailplane, such that the system automatically blows and sucks air depending on the airfoil flap position.

According to a third aspect of the invention there is provided an airfoil provided with a system for controlling the boundary layer of a laminar flow airfoil to reduce profile drag during flap deflection, according to the second aspect of the invention.

According to a fourth aspect of the invention there is provided an aircraft provided with a system for controlling the boundary layer of a laminar flow airfoil to reduce profile drag during flap deflection, according to the second aspect of the invention.

BRIEF DESCRIPTION OF THE DRAWINGS

The invention will now be described further by way of a non-limiting example with reference to the accompanying drawings wherein.

DESCRIPTION OF A PREFERRED EMBODIMENT OF THE INVENTION

Figure 1:
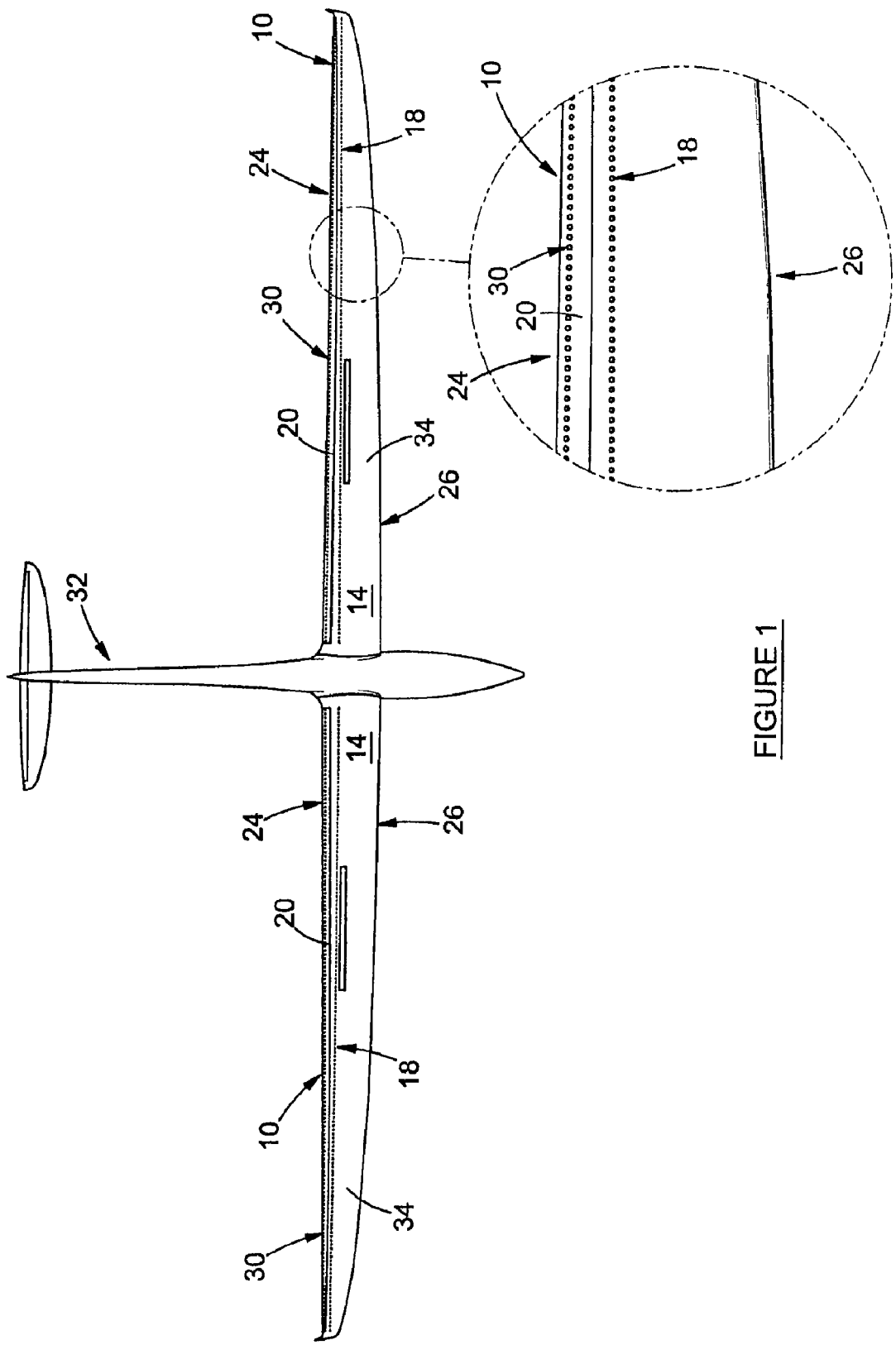
FIG. 1 is a view from below of a sailplane utilising a system according to a preferred embodiment of the invention.

Referring to the drawings, a system for controlling the boundary layer of a laminar flow airfoil 12 to reduce profile drag during flap deflection according to a preferred embodiment of the invention is generally designated by reference numeral 10.

The system 10 comprises first means for blowing air from a lower surface 14 of the airfoil 12 to trip airflow from laminar flow to turbulent flow during positive flap deflection; and second means for applying a suction force at the lower surface 14 of the airfoil 12 to preserve laminar flow during negative flap deflection.

The system 10 is utilised by a sailplane 32 including wings 34, to control the boundary layer of its laminar flow airfoils 12 to reduce profile drag during flap deflection.

The first means for blowing air from the airfoil 12 includes a blowing device, such as a pump (not shown). The pump blows air along a first passage 16 defined inside and along the length of the wings 34 of the sailplane 32 and through a first plurality of holes 18 defined along the length of the lower surface 14 of the wings 34. The arrangement is such that the first plurality of holes 18 are in fluid flow communication with the first passage 16. The air is blown in a direction normal to the lower surface 14 of the wings 34, as indicated by the arrows in FIG. 2A.

The airfoil 12 includes a pivotable flap 20 and defines a flap gap 22 at the point where the flap 20 pivots relative to the airfoil 12. The first plurality of holes 18 are located at a position towards the trailing edge 24 of the airfoil 12 but on the side of the leading edge 26 relative to the flap gap 22. The first plurality of holes 18 are located at a position of from 65% to 80% of the chord length of the airfoil 12 from the leading edge 26 towards the trailing edge 24 of the airfoil 12. More specifically, the first plurality of holes 18 are located at a position of approximately 71% of the chord length of the airfoil 12 from the leading edge 26 towards the trailing edge 24 of the airfoil 12.

The second means for applying a suction force at the lower surface 14 of the airfoil 12 during negative flap deflection is in the form of a suction device, such as a suction-pump (not shown). The suction pump is the same pump from which air is blown. Therefore, a single pump is used for blowing and sucking air. Air is thus sucked from the atmosphere into the first passage 16 via the first plurality of holes 18, as indicated by the arrows in FIG. 2C.

The system 10 includes a second passage 28 defined inside the flap 20 and a second plurality of holes 30 defined along the length of the lower surface 14 of the flap 20. The second plurality of holes are located at a position of from 90% to 98%, more specifically, at 95% of the chord length of the airfoil 12 from the leading edge 26 towards the trailing edge 24 of the airfoil 12. The second plurality of holes 30 are therefore in fluid flow communication with the second passage 28.

The pump also blows air along the second passage 28 through the second plurality of holes 30 at least when the flap 20 is in the negative flap deflection position, in order to trip the laminar flow to turbulent flow at the flap 20 in order to reduce the drag, by reducing separation bubble formation. Air could, however, also be blown along the second passage 28 through the second plurality of holes 30 when the flap 20 is in the positive flap deflection position.

The first and the second plurality of holes 18 and 30 consist of between 1500 and 2500 holes each, more specifically 2000 holes each. The holes 18 and 30 are spaced apart from each other at a distance of from 3 mm to 20 mm, more specifically from 8 mm to 12 mm and the diameter of each hole is from 0.2 mm to 2 mm, more specifically 0.7 mm.

In use, the pump is connected to controls of the sailplane 32, such that the system 10 automatically blows and sucks air depending on the flap deflection position. The pump is connected to the second passage 28 and blows air while the flap 20 is in the positive or negative flap deflection positions. The pump is also connected to the first passage 16, but only blows when the flap 20 is in the positive flap deflection position, and only sucks when the flap 20 is in the negative flap deflection position.

Figure 2A:
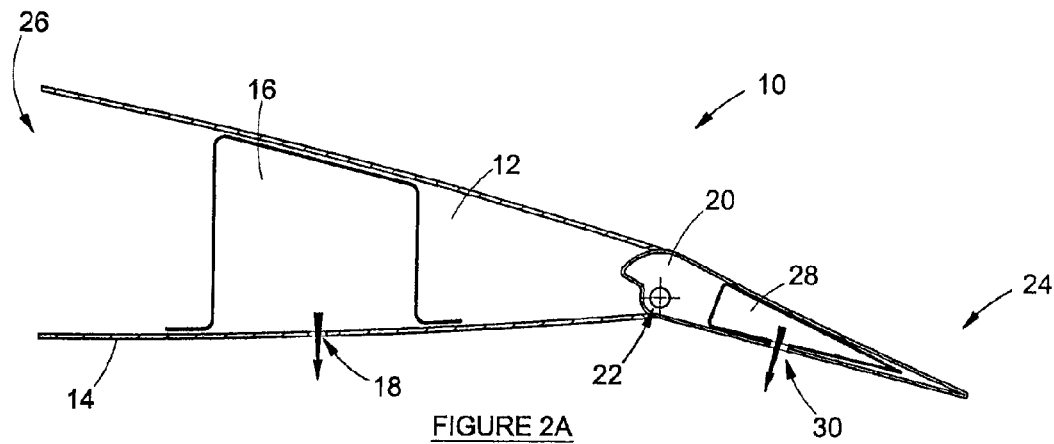
FIG. 2A is a cross-sectional side view of an airfoil of a sailplane and with a flap in a positive flap deflection position.
Figure 2B:
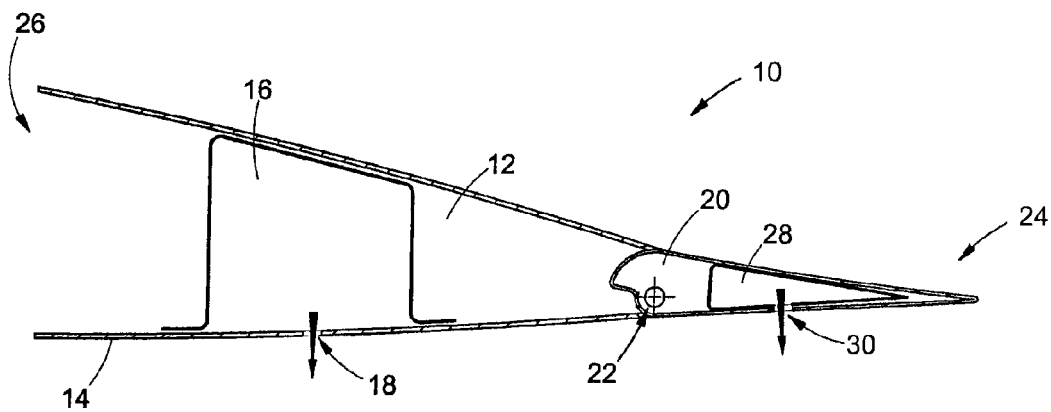
FIG. 2B is the same as FIG. 2A with the flap in an undeflected flap position.
Figure 2C:
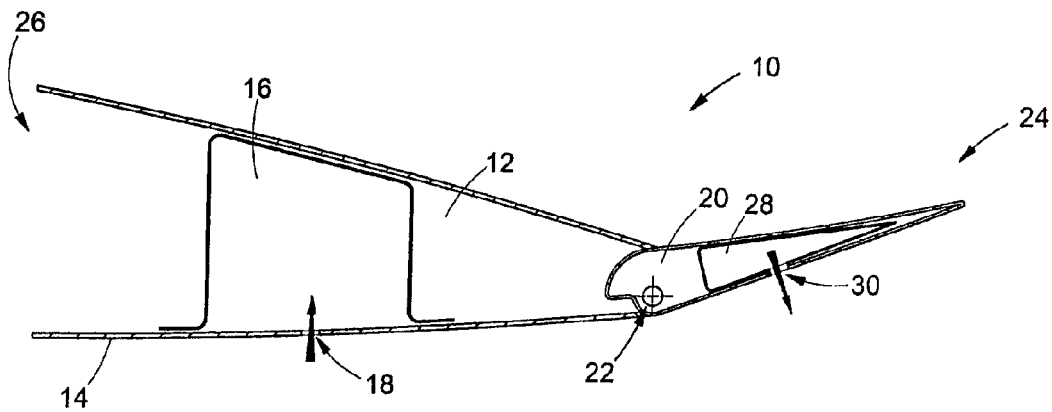
FIG. 2C is the same as FIG. 2A with the flap in a negative flap deflection position.

Therefore, when the flap 20 is in the negative flap deflection position, as shown in FIG. 2C, a suction force is applied at the lower surface 14 of the airfoil 12 to preserve laminar flow. The pump therefore sucks air from the atmosphere into the first passage 16 via the first plurality of holes 18. The pump simultaneously blows air along the second passage 28 through the second plurality of holes 30, in order to trip the laminar flow to turbulent flow at the flap 20 in order to reduce the drag, by reducing separation bubble formation.

When the flap 20 is in the positive flap deflection position, as shown in FIG. 2A, air is blown from the lower surface 14 of the airfoil 12 to trip the airflow from laminar to turbulent. The pump blows air along the first and second passages 16 and 28 via the first and second plurality of holes 18 and 30 to the atmosphere.

It is foreseen that the method and system for controlling the boundary layer of an airfoil decreases profile drag during positive flap deflection by eliminating the transition separation bubble, which thus leads to an increase in efficiency. Profile drag is further decreased during negative flap deflection since the system stabilises the laminar flow and allows laminar flow to be obtained for a longer duration. It is further foreseen that use of the system by a sailplane would decrease production difficulties of the wings of the sailplane in respect of wing-flap transition area, since this area is less critical and manufacturing tolerances could therefore be relaxed.

The system and method could be utilised by sailplanes, glider wings and airfoil sections, light and commercial aircraft wings, wind turbine blades, and aircraft fuselages.

It will be appreciated that variations in detail are possible with a method and system for controlling the boundary layer of an airfoil according to the invention without departing from the scope of the appended claims.

The invention claimed is:

1. An airfoil in the form of a wing, provided with a system for controlling the boundary layer of a laminar flow wing having a flap and a flap hinge line, to reduce profile drag during flap deflection, the system comprising:
    a first blower including a first plurality of holes along the length of the lower surface of the wing to blow air through the first plurality of holes only during positive flap deflection from a lower surface of the wing to trip flow from laminar to turbulent during such positive flap deflection;
    a suction device to apply a suction force at the lower surface of the wing to preserve laminar flow past the flap hinge line only during negative flap deflection; and
    a second blower including a second plurality of holes defined along the length of the lower surface of the flap to blow air from a lower surface of the flap to trip flow from laminar to turbulent before the trailing edge of the flap to reduce separation bubble formation during negative flap deflection.

2. The airfoil according to claim 1, wherein the first blower includes a passage along the inside length of the wing along which the air is blown and a blowing device for blowing air along the passage, in use.

3. The airfoil according to claim 2, wherein the blowing device is to blow air from the passage through the first plurality of holes in a direction normal to the surface from which it is blown.

4. The airfoil according to claim 3, wherein the flap hinge line is defined along the line where the flap hinges to the wing, and wherein the air is blown from the first plurality of holes located at a position towards the trailing edge of the wing, but on the side of the flap hinge line opposite the flap.

5. The airfoil according to claim 4, wherein the first plurality of holes are located at a position of from 65% to 80% of the chord length of the wing from the leading edge of the wing towards the trailing edge of the wing.

6. The airfoil according to claim 5, wherein the first plurality of holes are located at a position of 71% of the chord length of the wing from the leading edge towards the trailing edge of the wing.

7. The airfoil according to claim 1, wherein the suction device includes a passage along the inside length of the wing along which the air is sucked.

8. The airfoil according to claim 7, wherein the passage along which the air is blown is the same passage as the passage along which the air is sucked.

9. The airfoil according to claim 8, wherein the suction device includes a suction-pump.

10. The airfoil according to claim 8, wherein the air is sucked along the passage from the second plurality of holes.

11. The airfoil according to claim 10, wherein the second plurality of holes are located at a position of from 90% to 98% of the chord length of the wing from the leading edge towards the trailing edge of the wing.

12. The airfoil according to claim 11, wherein the second plurality of holes are located at a position of 95% of the chord length of the wing from the leading edge towards the trailing edge of the airfoil wing.

13. The airfoil according to claim 1, wherein the second blower blows air from the second plurality of holes at least when the flaps are in the negative deflection, in order to trip the laminar flow to turbulent flow at the flap in order to reduce the drag, by reducing separation bubble formation.

14. The airfoil according to claim 2, wherein the passage is a first passage and the system includes a second passage along which at least one of the first blower and the second blower blows air through the second plurality of holes.

15. The airfoil according to claim 14, wherein at least one of the first blower and the second blower include a pump for blowing air along the passage.

16. The airfoil according to claim 15, wherein the first blower, the second blower, and the suction device all include a single pump.

17. The airfoil according to claim 1 which is utilised by a sailplane and the suction device, the first blower, and the second blower are connected to controls of the sailplane, such that the system automatically blows and sucks air depending on flap deflection.

18. An aircraft provided with a system for controlling the boundary layer of a laminar flow wing to reduce profile drag during flap deflection according to claim 1.

* * * * *